United States Patent
Tang

(10) Patent No.: US 11,202,322 B2
(45) Date of Patent: Dec. 14, 2021

(54) RANDOM ACCESS METHOD AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 117 days.

(21) Appl. No.: 16/627,253

(22) PCT Filed: Jul. 20, 2017

(86) PCT No.: PCT/CN2017/093736
§ 371 (c)(1),
(2) Date: Dec. 27, 2019

(87) PCT Pub. No.: WO2019/014904
PCT Pub. Date: Jan. 24, 2019

(65) Prior Publication Data
US 2020/0137802 A1    Apr. 30, 2020

(51) Int. Cl.
*H04W 4/00* (2018.01)
*H04W 74/08* (2009.01)

(52) U.S. Cl.
CPC .................. *H04W 74/0833* (2013.01)

(58) Field of Classification Search
CPC  H04W 74/0833; H04W 74/002; H04W 74/08
USPC ............... 370/329–330, 335–345, 347–348
See application file for complete search history.

(56) References Cited

U.S. PATENT DOCUMENTS

| | | | | |
|---|---|---|---|---|
| 8,644,129 B2* | 2/2014 | Dinan | ............... | H04W 74/0833 370/206 |
| 9,867,197 B2* | 1/2018 | Martin | ............... | H04W 72/048 |
| 2010/0238859 A1* | 9/2010 | Vukovic | ........... | H04W 74/0833 370/328 |
| 2011/0116364 A1* | 5/2011 | Zhang | .................... | H04W 74/08 370/216 |
| 2011/0194501 A1* | 8/2011 | Chung | .................. | H04L 5/0053 370/328 |
| 2014/0376466 A1 | 12/2014 | Jeong et al. | | |

(Continued)

FOREIGN PATENT DOCUMENTS

| | | |
|---|---|---|
| CN | 103916974 | 7/2014 |
| CN | 105409136 | 3/2016 |

(Continued)

OTHER PUBLICATIONS

Ericsson, "Multiple Preamble Transmissions in NR Random Access," 3GPP TSG-RAN WG2 #98-AH, Tdoc R2-1707131, Jun. 2017, 7 pages.

(Continued)

*Primary Examiner* — Thai D Hoang
(74) *Attorney, Agent, or Firm* — Hodgson Russ LLP

(57) ABSTRACT

Disclosed in embodiments of the present disclosure are a random access method and terminal device. The method includes: transmitting, by a terminal device, a plurality of preambles to a network device in one random access procedure; and monitoring, by the terminal device, a Random Access Response (RAR) to at least one preamble in the plurality of preambles in at least one RAR window.

12 Claims, 4 Drawing Sheets

(56) References Cited

U.S. PATENT DOCUMENTS

| | | | |
|---|---|---|---|
| 2015/0016312 A1* | 1/2015 | Li | H04W 74/006 370/280 |
| 2015/0117374 A1* | 4/2015 | Wu | H04W 74/0891 370/329 |
| 2016/0227580 A1* | 8/2016 | Xiong | H04W 72/048 |
| 2017/0013643 A1* | 1/2017 | Nan | H04W 74/0833 |
| 2017/0094688 A1 | 3/2017 | Lee et al. | |
| 2017/0273113 A1* | 9/2017 | Tirronen | H04W 4/70 |
| 2017/0279646 A1* | 9/2017 | Yi | H04L 5/0007 |
| 2017/0280481 A1* | 9/2017 | Stern-Berkowitz | H04W 74/0833 |
| 2018/0184306 A1* | 6/2018 | Xiong | H04L 27/2602 |
| 2019/0141728 A1* | 5/2019 | Takeda | H04L 27/2692 |
| 2019/0320430 A1* | 10/2019 | Kim | H04L 27/2613 |
| 2019/0357200 A1* | 11/2019 | Futaki | H04W 4/70 |
| 2019/0387546 A1* | 12/2019 | Li | H04L 27/26025 |
| 2020/0112996 A1* | 4/2020 | Pan | H04L 1/18 |

FOREIGN PATENT DOCUMENTS

| | | |
|---|---|---|
| CN | 105794297 | 7/2016 |
| CN | 105874726 | 8/2016 |
| CN | 106559905 | 4/2017 |
| CN | 106686691 | 5/2017 |
| EP | 3048851 | 7/2016 |
| EP | 3148281 | 3/2017 |
| WO | 2016045532 | 3/2016 |
| WO | 2016086144 | 6/2016 |

OTHER PUBLICATIONS

Ericsson, "NR random-access response design," 3GPP TSG-RAN WG1 Meeting #89, R1-1708731, May 2017, 8 pages.

Intel Corporation, "Random Access Multi-Beam Aspects," 3GPP TSG RAN WG2#NR_AdHoc#2, R2-1707028 (Revision of R2-1701744), Jun. 2017, 3 pages.

Vivo, "RACH procedure of multiple preambles transmission," 3GPP TSG-RAN WG2 NR Ad Hoc, R2-1707078, Jun. 2017, 5 pages.

EPO, Office Action for EP Application No. 17918619.2, dated Mar. 11, 2020.

WIPO, ISR for PCT/CN2017/093736, Mar. 28, 2018.

IPIN, Office Action for IN Application No. 201917054706, dated May 5, 2021.

JPO, Office Action for JP Application No. 2019-564419, dated Jun. 11, 2021.

LG Electronics Inc., "Prioritized RA Procedure," 3GPP TSG-RAN WG2 NR Adhoc, R2-1706848, Jun. 2017, 2 pages.

KIPO, Office Action for KR Application No. 10-2019-7034347, dated Mar. 30, 2021.

* cited by examiner

RANDOM ACCESS METHOD AND TERMINAL DEVICE

CROSS-REFERENCE TO RELATED APPLICATION

This application is a U.S. national phase application of International Application No. PCT/CN2017/093736, filed Jul. 20, 2017, the entire disclosure of which is incorporated herein by reference.

TECHNICAL FIELD

Embodiments of the present disclosure relate to the field of communication, and more particularly, to a random access method and a terminal device.

BACKGROUND

In the existing long term evolution (LTE) system, a random access procedure is classified as a contention based access procedure and a non-contention based access procedure. The non-contention based access procedure is an access procedure initiated by using a dedicated random preamble which is configured by a network device for a terminal device, while the contention based access procedure is initiated by the terminal device requesting a preamble. The reliability of the preamble transmission is not high enough, regardless of whether the terminal device performs the random access by the contention based access or the non-contention based access.

SUMMARY

In view of the above, embodiments of the present disclosure provide a random access method, a terminal device, and a network device, which are beneficial to improving the reliability of preamble transmission and probability of a network device responding to a preamble.

In a first aspect, there is provided a random access method, including: transmitting, by a terminal device, a plurality of preambles to a network device in one random access procedure; and monitoring, by the terminal device, a Random Access Response (RAR) to at least one preamble in the plurality of preambles in at least one RAR window.

The so-called one random access procedure refers to a scenario in which the terminal device continuously transmits a plurality of preambles to the network device, but not the scenario in which the terminal device retransmits the preamble after a random access for the preamble transmitted last time fails.

The terminal device transmits the plurality of preambles to the network device in one random access procedure, which is beneficial to improving the reliability of the preamble transmission and the probability for the network device to respond to the preamble.

The plurality of preambles may be preambles with completely different sequences, or may be preambles including the same sequence. The plurality of preambles may be transmitted using different beams, or may be transmitted using the same beam. In a possible implementation, the at least one RAR window includes one RAR window, a starting position of the one RAR window in a time domain is located after transmission of the plurality of preambles. Monitoring, by the terminal device, a RAR to at least one preamble in the plurality of preambles in at least one random access response RAR window, includes: monitoring, by the terminal device, RARs to at least two of the plurality of preambles in the one RAR window.

In a possible implementation, the at least one RAR window includes one RAR window, the starting position of the one RAR window in the time domain is located after transmission of a first preamble in the plurality of preambles and before transmission of a second preamble in the plurality of preambles. Monitoring, by the terminal device, a RAR to at least one preamble in the plurality of preambles in at least one random access response RAR window, includes: monitoring, by the terminal device, RARs to at least two preambles of the plurality of preambles in the one RAR window.

Optionally, the terminal device may configure one RAR window for the plurality of preambles, and the starting position of the RAR window in the time domain may be between any two preamble transmissions.

In a possible implementation, the at least one RAR window includes a plurality of RAR windows corresponding to the plurality of preambles in one-to-one correspondence, and a starting position of each of the plurality of RAR windows in the time domain is located after the transmission of a corresponding preamble. Monitoring, by the terminal device, a RAR to at least one preamble in the plurality of preambles in at least one random access response RAR window, includes: monitoring, by the terminal device, the RAR to the corresponding preamble in each RAR window.

Optionally, the terminal device may also configure a combination of the foregoing three RAR windows for the plurality of preambles.

In a possible implementation, a starting position of a first RAR window in the plurality of RAR windows in the time domain is located in a Kth sub-frame after transmission of the preamble corresponding to the first RAR window, where K is an integer smaller than 3.

Optionally, a length of K sub-frames is 3 ms.

By shortening a time interval between the RAR window and the preamble transmission, the terminal device can monitor the corresponding RAR more quickly, which is advantageous for the terminal device to perform random access.

In a possible implementation, transmitting, by a terminal device, a plurality of preambles to a network device in one random access procedure, includes: transmitting, by the terminal device, the plurality of preambles to the network device through at least one Physical Random Access Channel (PRACH) resource in one random access procedure.

In a possible implementation, transmitting, by the terminal device, the plurality of preambles to the network device through at least one physical random access channel PRACH resource, includes: transmitting, by the terminal device, the plurality of preambles to the network device through a plurality of PRACH resources corresponding to the plurality of preambles one to one in one random access procedure.

Optionally, the network device may configure the plurality of PRACH resources to transmit the plurality of preambles in advance, or may configure one PRACH resource to transmit the plurality of preambles, and the terminal device determines by itself to use a certain location in the one PRACH resource to transmit the corresponding preamble. The network device may also configure that the plurality of PRACH resources correspond to one beam, or different PRACH resources correspond to different beams.

In a possible implementation, after the terminal device monitors the RAR to the first preamble in the plurality of preambles in the at least one RAR window, the method further includes: transmitting, by the terminal device, a third message in the random access procedure to the network device according to an uplink grant carried in the RAR to the first preamble.

Optionally, the third message in the random access procedure may carry a radio resource control (RRC) connection request, and may also carry some control messages or even service data packets, or the like.

In a possible implementation, the RAR to the first preamble is a RAR that the terminal device first monitors in the at least one RAR window.

In a possible implementation, the random access procedure is a contention based random access procedure, or a non-contention based random access procedure, or a random access procedure for obtaining system information.

In a second aspect, there is provided a random access method, including: receiving, by a network device, a plurality of preambles transmitted by a terminal device in one random access procedure; and feeding back, by the network device, at least one Random Access Response (RAR) corresponding to at least one preamble in the plurality of preambles to the terminal device.

In a possible implementation, feeding back, by the network device, at least one RAR corresponding to at least one preamble in the plurality of preambles to the terminal device, includes: after receiving a first preamble in the plurality of preambles, feeding back by the network device the RAR corresponding to the first preamble to the terminal device; after receiving the preamble(s) other than the first preamble in the plurality of preambles, not feeding back by the network device the RAR to the terminal device.

In a possible implementation, the at least one RAR includes a plurality of RARs corresponding to the plurality of preambles one to one. Feeding back, by the network device, at least one random access response RAR corresponding to at least one preamble in the plurality of preambles to the terminal device, includes: each time after receiving one of the plurality of preambles, feeding back by the network device a corresponding RAR to the terminal device.

In a possible implementation, feeding back, by the network device, at least one random access response RAR corresponding to at least one preamble in the plurality of preambles to the terminal device, includes: feeding back, by the network device, the at least one RAR to the terminal device, after receiving of the plurality of preambles is completed.

In a possible implementation, feeding back, by the network device, at least one RAR corresponding to at least one preamble to the terminal device after receiving of the plurality of preambles is completed, includes: after receiving of the plurality of preambles is completed, feeding back, by the network device, the at least one RAR to the terminal device according to strengths of signals for receiving the plurality of preambles or a sequence for receiving the plurality of preambles.

In a possible implementation, the at least one RAR includes the multiple RARs, and the multiple RARs are carried in one Medium Access Control (MAC) Data Protocol Unit (PDU).

Optionally, the network device receives the plurality of preambles transmitted by the terminal device through at least one Physical Random Access Channel (PRACH) resource in one random access procedure.

Further, the network device receives the plurality of preambles transmitted by the terminal device through multiple PRACH resources corresponding to the plurality of preambles one to one in the one random access procedure.

In a third aspect, there is provided a terminal device. The terminal device is configured to perform the methods of the first aspect or any exemplary implementation manner of the first aspect described above. In particular, the terminal device includes units for performing the methods of the first aspect or any exemplary implementation manner of the first aspect described above.

In a fourth aspect, there is provided a network device. The network device is configured to perform the methods of the second aspect or any exemplary implementation manner of the second aspect described above. In particular, the network device includes units for performing the methods of the second aspect or any exemplary implementation manner of the second aspect described above.

In a fifth aspect, there is provided a terminal device, including: a memory, a processor, an input interface, and an output interface. The memory, the processor, the input interface, and the output interface communicate with each other via a bus system. The memory stores instructions, and the processor is configured to execute the instructions stored in the memory to perform the methods of the first aspect or any exemplary implementation manner of the first aspect described above.

In a sixth aspect, a network device is provided, including: a memory, a processor, an input interface, and an output interface. The memory, the processor, the input interface, and the output interface communicate with each other via a bus system. The memory stores instructions, and the processor is configured to execute the instructions stored in the memory to perform the methods of the second aspect or any exemplary implementation manner of the second aspect described above.

In a seventh aspect, there is provided a computer storage medium for storing computer software instructions configured to perform the methods of the first aspect or any exemplary implementation manner of the first aspect described above, or to perform the methods of the second aspect or any exemplary implementation manner of the second aspect described above, wherein the computer software instructions include a program designed to perform the above aspects.

In an eighth aspect, a computer program product is provided, wherein when the computer program product is run on a computer, the computer is caused to perform the methods of the first aspect or any exemplary implementation manner of the first aspect described above, or to perform the methods of the second aspect or any exemplary implementation manner of the second aspect described above.

These and other aspects of the present disclosure will be more readily apparent from the following description of the embodiments.

DETAILED DESCRIPTION

Figure 1:
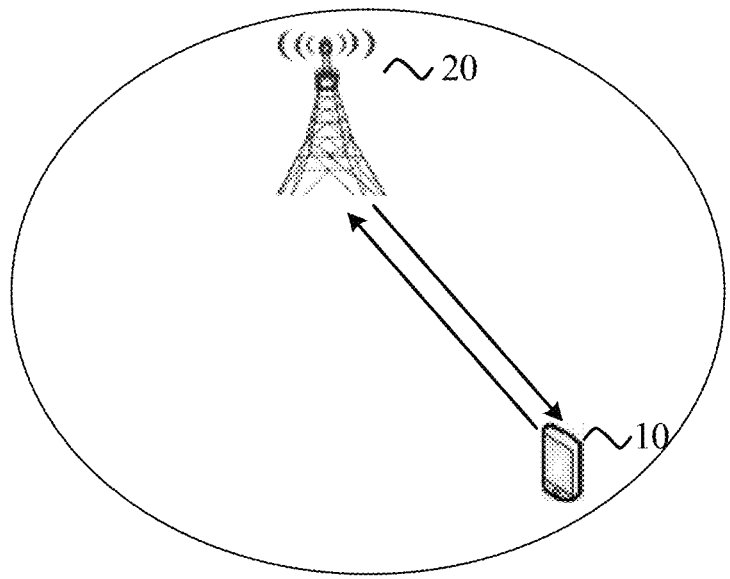
FIG. 1 shows a schematic diagram of an application scenario of an embodiment of the present disclosure.

The technical solutions in the embodiments of the present disclosure will be described below clearly and completely with reference to the accompanying drawings.

The technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), an universal mobile telecommunication system (UMTS), a worldwide interoperability for microwave access (WiMAX) communication system, a New Radio (NR) system or a future 5G communication system, and the like.

In particular, the technical solutions of the embodiments of the present disclosure can be applied to various communication systems based on non-orthogonal multiple access technologies, such as a sparse code multiple access (SCMA) system, and a low density signature (LDS) system, etc. Of course, the SCMA system and the LDS system may also be referred to as other names in the communication field; further, the technical solution of the embodiments of the present disclosure can be applied to a multi-carrier transmission system using the non-orthogonal multiple access technology, such as a orthogonal frequency division multiplexing (OFDM) system, a filter bank multi-carrier (FBMC) system, a generalized frequency division multiplexing (GFDM) system, a filtered orthogonal frequency division multiplexing (F-OFDM) system and the like, which use the non-orthogonal multiple access technology.

The terminal device in the embodiments of the present disclosure may be referred to as a user equipment (UE), an access terminal, a subscriber unit, a subscriber station, a mobile station, mobile equipment, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication capability, a computing devices or other processing devices connected to wireless modems, an in-vehicle device, a wearable device, a terminal device in a future 5G networks, or a terminal device in a future evolutional public land mobile network (PLMN), and so on, and embodiments of the present disclosure do not impose specific limitations on this.

The network device in the embodiments of the present disclosure may be a device for communicating with the terminal device. The network device may be a base transceiver station (BTS) in the GSM system or the CDMA system, or a node base (NodeB, NB) in the WCDMA system, or an evolutional node base (eNB or eNodeB) in the LTE system, or a wireless controller in a cloud radio access network (CRAN), or the network device may be a relay station, an access point, an in-vehicle device, a wearable device, and a network side device in a future 5G network or a network side device in a future evolutional PLMN network and so on, and embodiments of the present disclosure do not impose specific limitations on this.

FIG. 1 is a schematic diagram of an application scenario of an embodiment of the present disclosure. A communication system in FIG. 1 may include a terminal device 10 and a network device 20. The network device 20 is configured to provide communication services for the terminal device 10 and access a core network. The terminal device 10 can access the network by searching for synchronization signals, broadcast signals, and the like transmitted by the network device 20, thereby performing communications with the network. Arrows shown in FIG. 1 may represent uplink/downlink transmissions by a cellular link between the terminal device 10 and the network device 20.

Figure 2:
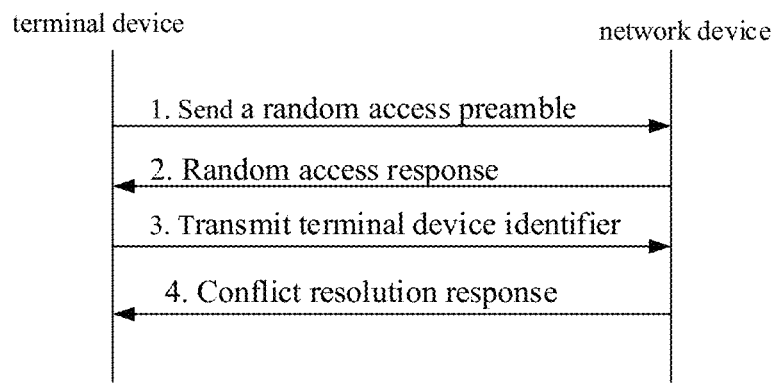
FIG. 2 shows a schematic flow chart of a random access procedure.

The random access technology is the primary content of users communicating with networks in mobile communication systems. In a wireless cellular network, a user initiates a connection request to the network side through a random access procedure. In the LTE system, the main purpose of the random access is to establish an uplink synchronization and receive necessary Cell Radio Network Temporary Identifier (C-RNTI). Therefore, the random access is not only applied in an initial access, but also in a case where the user's uplink synchronization is lost. For ease of understanding, the random access procedure will be briefly described below with reference to FIG. 2. As shown in FIG. 2, the random access procedure mainly includes the following contents:

1. First, a preamble for the random access is transmitted. The main purpose for sending the preamble is that the network device can correctly estimate the transmission delay of the terminal device, and a conflict problem that multiple terminal devices simultaneously initiate access requests can be solved.

2. The feedback information (that is, the Random Access Response (RAR)) transmitted by the network device to the terminal includes the transmission delay required for the uplink synchronization, and an access overload state of a current system (for adopting a backoff mechanism for conflict avoidance by the terminal device). In addition, the network device also feeds back the uplink resource location allocated to the access terminal device to the terminal.

3. The terminal device will transmit a message corresponding to a random access event and a terminal device identifier C-RNTI of the terminal device itself on the specified uplink resource.

4. The network device feeds back conflict resolution information to the terminal device. At this point, the random access procedure completely solves the conflict problem caused by the multiple terminal devices requesting access to the system at the same time.

Due to the limited access resources, when the multiple terminal devices initiate access on the same access resource at the same time, a collision will occur. The terminal device may determine whether the random access fails according to whether the feedback information in the above step 2 is received within the random access response time window or whether the preamble included in the received feedback information matches the preamble transmitted by the terminal device itself. Specifically, if the terminal device does not receive the feedback information in the random access response time window, or there is no preamble in the received feedback information matching the preamble transmitted by the terminal device itself, the terminal device may consider that the random access fails. In addition, the terminal device may further determine that the contention resolution fails according to the conflict resolution information in the foregoing step 4, and may also determine that the random access fails.

In the research of future wireless communication systems such as 5G, the beamforming technology is an important technology for improving coverage and spectrum efficiency. The beamforming (BF) is an implementation of an adaptive array smart antenna, and is a digital signal processing technology implemented on an antenna array composed of multiple array elements. BF utilizes the difference in the spatial channel characteristics such as an angle of arrival between the useful signals and the interference signals. By the appropriate weighting value being set to the antenna array, the useful signals and the interference signals are spatially isolated, thereby reducing the interference between users and improving the system capacity.

In the random access procedure, the terminal device may transmit the preamble(s) to the network device by using multiple beams to improve the probability for the network device to respond to the random access of the terminal device. If the communication system supports the transmission of a plurality of preambles, the monitoring for the RAR window becomes a problem to be solved.

Figure 3:
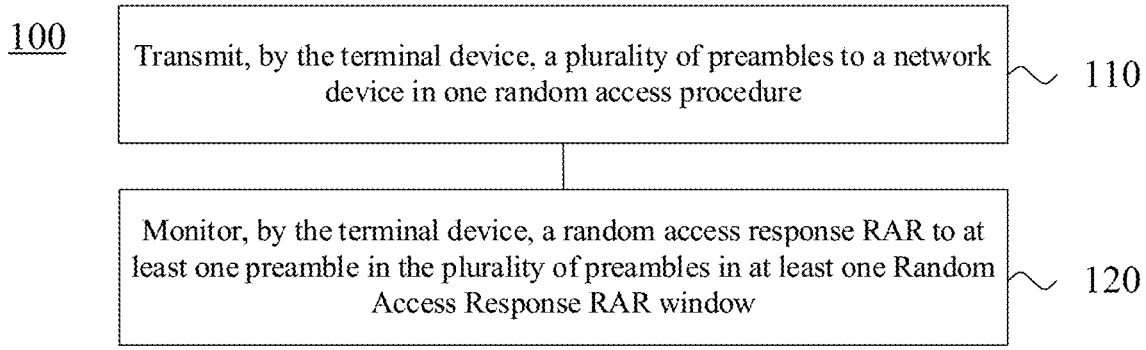
FIG. 3 shows a schematic block diagram of a random access method of an embodiment of the present disclosure.

FIG. 3 shows a schematic block diagram of a random access method 100 according to an embodiment of the present disclosure. As shown in FIG. 3, the method 100 can include some or all of the following:

In S110, a terminal device transmits a plurality of preambles to a network device in one random access procedure.

In S120, the terminal device monitors a Random Access Response RAR to at least one preamble in the plurality of preambles in at least one random access response RAR window.

According to exemplary embodiments, the following points are stated:

1. The application scenario of the embodiment of the present disclosure is that a plurality of preambles are transmitted in one random access procedure, which is different from the scenario in the LTE system where the terminal device transmits one preamble to the network device in one random access procedure, and if the random access fails, the terminal device transmits the same preamble to the network device again. In other words, the terminal device continuously transmits a plurality of preambles in one random access procedure, and it is not required that the terminal device transmits the preamble again if the terminal device does not monitor the RAR to the preamble transmitted last time.

2. In the embodiment of the present disclosure, the plurality of preambles may be preambles with completely different sequences, or may be preambles of the same sequence. The plurality of preambles may be transmitted using different beams, or may be transmitted using the same beam, which is not specifically limited herein.

Figure 4:
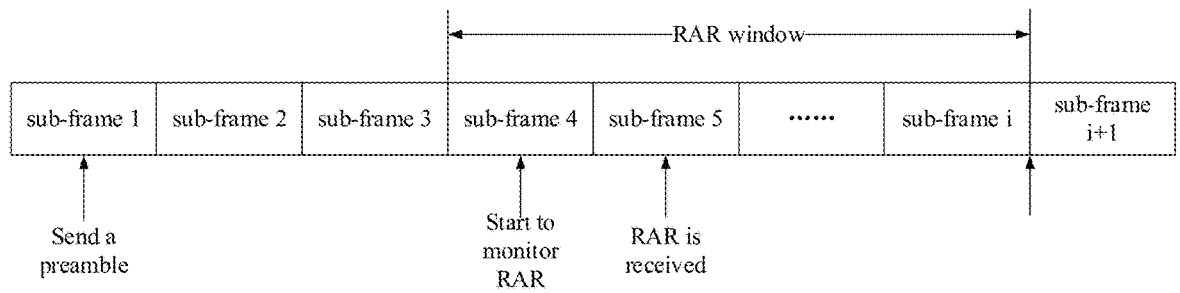
FIG. 4 shows a schematic diagram of a positional relationship between a preamble and an RAR window in a time domain according to an embodiment of the present disclosure.

3. It is understood by those skilled in the art that after transmitting the preamble, the UE will monitor the Physical Downlink Control Channel (PDCCH) in the RAR window to receive the RAR corresponding to the preamble. If the RAR that the eNodeB sends is not received within this RAR time window, it is considered that the random access procedure fails. As shown in FIG. 4, the terminal device transmits the preamble to the network device in sub-frame 1, and the terminal device starts monitoring the RAR from the sub-frame 4, and the terminal device may monitor the RAR in the sub-frame 5 or monitor the RAR in other sub-frames within the RAR window, or the terminal device may not monitor a corresponding RAR within the RAR window. The length of the RAR window in the time domain can be configured by a parameter ra-Response WindowSize. The relative position of the sub-frame in which the preamble is transmitted and the RAR window can also be specified by the protocol.

4. An uplink resource is occupied or used by the terminal device to transmit the preamble, while a downlink resource is occupied or used by the terminal device to monitor the RAR. That is, the resource that the terminal device transmits the preamble and the resource that the terminal device monitors the RAR may not overlap in the frequency domain, and may overlap in the time domain. For example, in the embodiment of the present disclosure, the terminal device may transmit a second preamble in the sub-frame 4 in FIG. 4, and monitor the RAR to the second preamble within the RAR window after the sub-frame 4.

Therefore, in the random access method in the embodiment of the present disclosure, the terminal device transmits the plurality of preambles to the network device in one random access procedure, which is beneficial to improving the reliability of preamble transmission and probability of a network device responding to a preamble.

According to an exemplary embodiment of the present disclosure, the at least one RAR window includes one RAR window, and a starting position of the one RAR window in a time domain is located the transmission of the at least one preamble of the plurality of preambles. Monitoring, by the terminal device, a RAR to at least one preamble in the plurality of preambles in at least one random access response RAR window, includes: monitoring, by the terminal device, RARs to the at least two preambles of the plurality of preambles in the one RAR window.

Figure 5:
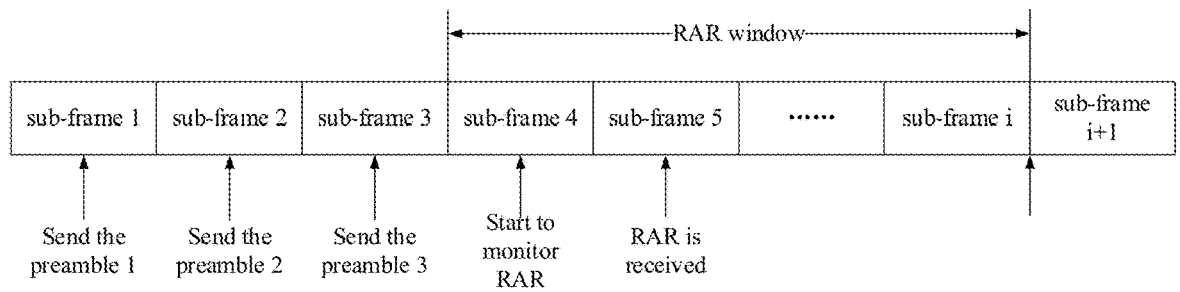
FIG. 5 shows a schematic diagram of another positional relationship between a preamble and an RAR window in a time domain according to an embodiment of the present disclosure.

Specifically, the network device may configure one RAR window in advance, and the starting position of the RAR window in the time domain is after the terminal device transmitting the plurality of preambles, as shown in FIG. 5. It is assumed that the network device configures the transmission resources for three preambles for the terminal device, and configure that the three preambles are transmitted in sub-frame 1, sub-frame 2, and sub-frame 3, respectively. If the protocol specifies that the starting sub-frame of the RAR window is after the sub-frame for transmitting the last preamble by the terminal device, the terminal device can monitor the RARs to the three preambles in the RAR window starting from the sub-frame 4.

It should be understood that the position for the terminal device to transmit the preamble and the length of the RAR window may be configured in advance by the network device or specified by the protocol. The protocol specification refers to the factory configuration of the terminal device.

It should also be understood that the RAR window configured by the network device may be configured for the plurality of preambles, but the terminal device does not necessarily monitor the RAR to each of the plurality of preambles within the RAR window. In other words, the terminal device can monitor the RAR to at least one of the plurality of preambles in one RAR window after the transmission of the plurality of preambles. For example, the terminal device may monitor any combination of the RAR to the preamble transmitted on the sub-frame 1, the RAR to the preamble transmitted on the sub-frame 2, and the RAR to the preamble transmitted on the sub-frame 3 in the RAR window as shown in FIG. 5.

According to an exemplary embodiment of the present disclosure, the at least one RAR window includes one RAR window, and the starting position of the one RAR window in the time domain is located after transmission of a first preamble in the plurality of preambles and before a second preamble transmission in the plurality of preambles. Monitoring, by the terminal device, a random access response RAR to at least one preamble in the plurality of preambles in at least one random access response RAR window, includes: monitoring, by the terminal device, the RAR to the at least two preambles of the plurality of preambles in the one RAR window.

Figure 6:
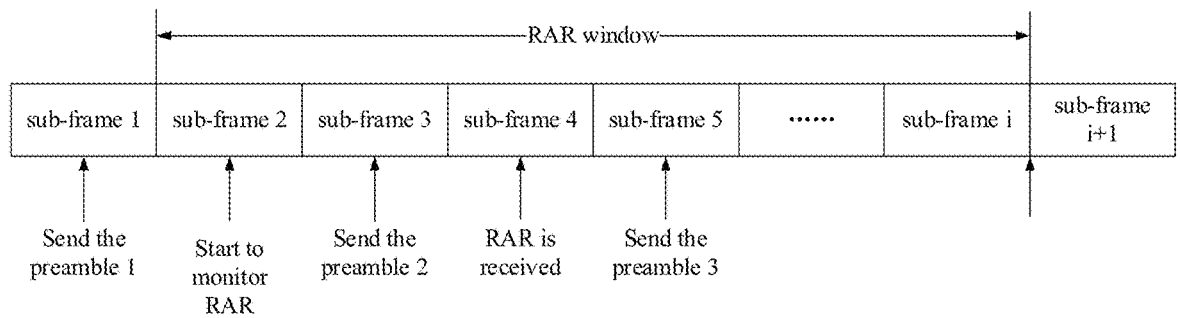
FIG. 6 shows a schematic diagram of still another positional relationship between a preamble and an RAR window in a time domain according to an embodiment of the present disclosure.

For example, the network device may configure one RAR window in advance, and the starting position of the RAR window in the time domain is located after transmission of the first preamble and before transmission of the second preamble, as shown in FIG. 6. It is assumed that the network device configures the transmission resources for three preambles for the terminal device, and the terminal device transmits three preambles to the network device in one random process, and configures that the three preambles are transmitted in sub-frame 1, sub-frame 3, and sub-frame 5, respectively. If the protocol specifies that the starting sub-frame of the RAR window is after the sub-frame corresponding to the first transmitted preamble and before the sub-frame corresponding to the second transmitted preamble of the terminal device, the terminal device can monitor the RARs to the three preambles in the RAR window starting from the sub-frame 2.

It should be understood that the ending position of the RAR window in the time domain may be after the location of the last preamble transmitted by the terminal device in the time domain.

It should also be understood that the RAR window configured by the network device may be configured for the plurality of preambles, but the terminal device does not necessarily monitor the RAR to each of the plurality of preambles within the RAR window. In other words, the terminal device can monitor the RAR to at least one of the plurality of preambles in one RAR window after the transmission of the first preamble. For example, the terminal device may monitor any combination of the RAR to the preamble transmitted on the sub-frame 1, the RAR to the preamble transmitted on the sub-frame 3, and the RAR to the preamble transmitted on the sub-frame 5 in the RAR window as in FIG. 6.

Figure 7:
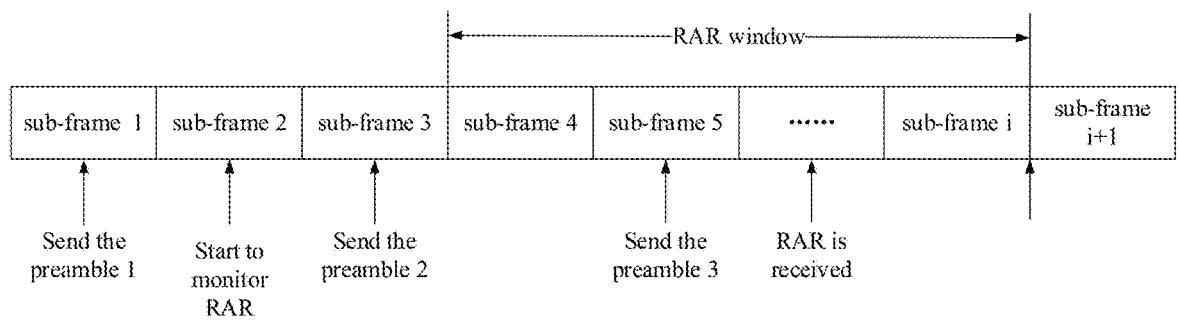
FIG. 7 shows a schematic diagram of still another positional relationship between a preamble and an RAR window in a time domain according to an embodiment of the present disclosure.

According to an exemplary embodiment, the network device may also configure one RAR window for the plurality of preambles, and the starting position of the RAR window in the time domain may be between any two preamble transmissions. The embodiments of the present disclosure are not limited thereto. For example, as shown in FIG. 7, the network device configures the transmission resources for three preambles for the terminal device, and the terminal device transmits three preambles to the network device in one random process, and the three preambles are transmitted in sub-frame 1, sub-frame 3, and sub-frame 5, respectively. If the protocol specifies that the starting sub-frame of the RAR window is after the sub-frame corresponding to the second transmitted preamble of the terminal device, the terminal device can monitor any combination of the RAR to the preamble transmitted on the sub-frame 1, the RAR to the preamble transmitted on the sub-frame 3, and the RAR to the preamble transmitted on the sub-frame 5 in the RAR window starting from the sub-frame 4 as shown in FIG. 7.

Figure 8:
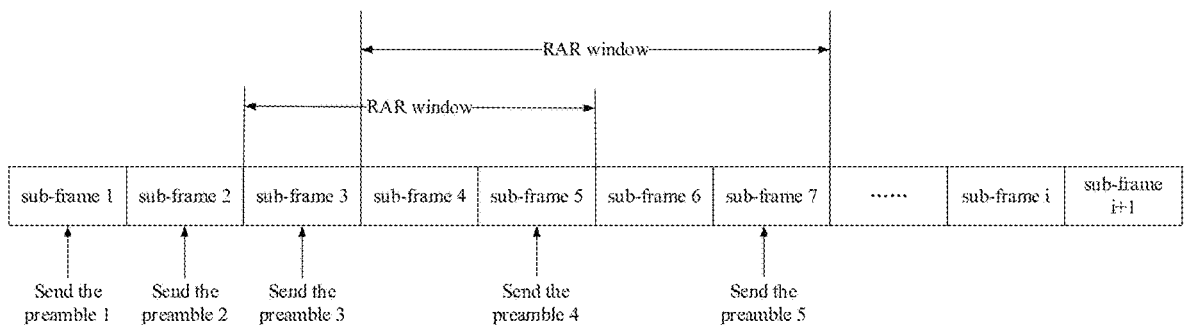
FIG. 8 shows a schematic diagram of still another positional relationship between a preamble and an RAR window in a time domain according to an embodiment of the present disclosure.

According to an exemplary embodiment, the terminal device may also configure a combination of the foregoing two RAR windows for the plurality of preambles. For example, as shown in FIG. 8, the network device configures the transmission resources for five preambles for the terminal device, and the terminal device transmits five preambles to the network device in one random process, and the five preambles are transmitted in sub-frame 1, sub-frame 2, sub-frame 3, sub-frame 5 and sub-frame 7, respectively. The network device may configure one RAR window for the first two preambles, and another RAR window for the last three preambles. And, the starting position of the RAR window configured for the first two preambles in the time domain is sub-frame 3 (after the transmission of the first two preambles), and the starting position of the RAR window configured for the last three preambles in the time domain is sub-frame 4 (after the transmission of the third preamble and before the transmission of the fourth preamble). FIG. 8 is for illustration only and is not intended to limit the scope of the embodiments of the present disclosure.

According to an exemplary embodiment of the present disclosure, the at least one RAR window includes a plurality of RAR windows corresponding to the plurality of preambles in one-to-one correspondence, and a starting position of each of the plurality of RAR windows in the time domain is located after transmission of a corresponding preamble. Monitoring, by the terminal device, a random access response RAR to at least one preamble in the plurality of preambles in at least one random access response RAR window, includes: monitoring, by the terminal device, the RAR to the corresponding preamble in each RAR window.

Figure 9:
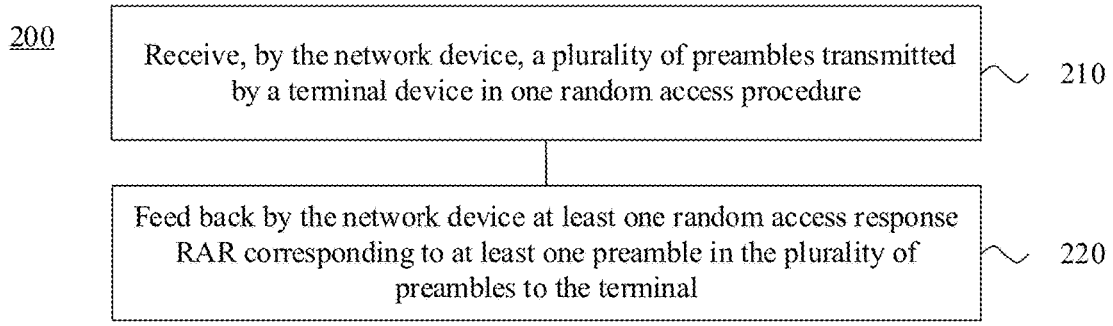
FIG. 9 shows another schematic block diagram of a random access method according to an embodiment of the present disclosure.

For example, the network device may configure one RAR window for each preamble in advance, and the starting position of each RAR window in the time domain is located after the transmission of the corresponding preamble, as shown in FIG. 9. It is assumed that the network device configures the transmission resources for three preambles for the terminal device, and the terminal device transmits three preambles to the network device in one random process, and the three preambles are transmitted in sub-frame 1, sub-frame 3, and sub-frame 5, respectively. The RAR window corresponding to the first preamble starts from sub-frame 2, the RAR window corresponding to the second preamble starts from the sub-frame 4, and the RAR window corresponding to the third preamble starts from the sub-frame 6. That is, the terminal device can monitor the RAR to the first preamble in the RAR window starting from sub-frame 2, monitor the RAR to the second preamble in the RAR window starting from sub-frame 4, and monitor the RAR to the third preamble in the RAR window starting from sub-frame 6.

It should be understood that the ending position of the RAR window in the time domain may be configured after any one of the preambles transmitted by the terminal device later.

According to an exemplary embodiment, the terminal device may configure a combination of the foregoing three RAR windows for multiple preambles. That is, the terminal device may configure a special RAR window for a part of the plurality of preambles, or may configure a common RAR window for a part of the preambles, and the starting position of the common RAR window in the time domain may be located after transmission of any preamble. For details, see FIG. 5 to FIG. 8. For brevity, details are not repeated herein again.

According to an exemplary embodiment, the starting position of the first RAR window in the plurality of RAR windows in the time domain is located in a Kth sub-frame after transmission of a preamble corresponding to the first RAR window, where K is an integer smaller than 3.

That is, in the foregoing solution that each preamble corresponds to one RAR window, the interval between the starting position of each RAR window in the time domain and the transmission position of the corresponding preamble may be smaller than 3 sub-frames, for example, may be smaller than 3 ms. It should be understood that the sub-frame length herein may be understood as 1 ms in LTE, or may be other time domain unit length, and the embodiments of the present disclosure are not limited thereto.

By shortening a time interval between the RAR window and the preamble transmission, the terminal device can monitor the corresponding RAR more quickly, which is advantageous for the terminal device to perform random access.

It should be understood that the interval between the starting position of each RAR window and the transmission position of the corresponding preamble may be smaller than 3 sub-frames, which can be applied to the various RAR windows described above. The embodiments of the present disclosure are not limited thereto. For example, in the solution described with reference to FIG. 5, the starting position of the RAR window configured by the network device for the terminal device may be the first two sub-frames after the last preamble transmission.

According to an exemplary embodiment of the present disclosure, transmitting, by the terminal device, a plurality of preambles to the network device in one random access procedure, including: transmitting, by the terminal device, the plurality of preambles to the network device through at least one Physical Random Access Channel (PRACH) resource in the one random access procedure.

According to an exemplary embodiment of the present disclosure, transmitting, by the terminal device, the plurality of preambles to the network device through at least one physical random access channel PRACH resource, includes: transmitting, by the terminal device, the plurality of preambles to the network device through a plurality of PRACH resources corresponding to the plurality of preambles one to one in the one random access procedure.

It is understood by those skilled in the art that, the PRACH is used for transmitting a random access preamble, the network device may configure a plurality of PRACH resources to transmit a plurality of preambles in advance, or may configure one PRACH resource to transmit the plurality of preambles, and the terminal device determines by itself to use a certain position in the one PRACH resource to transmit a corresponding preamble. The network device may also configure that the plurality of PRACH resources correspond to one beam, or different PRACH resources correspond to different beams, and the embodiments of the present disclosure are not limited thereto.

According to an exemplary embodiment of the present disclosure, after the terminal device monitors the RAR to the first preamble in the plurality of preambles in the at least one RAR window, the method further includes: transmitting, by the terminal device, a message corresponding to the random access event to the network device according to an uplink grant carried in the RAR to the first preamble.

After the terminal device monitors the RAR to a certain preamble, the terminal device may transmit a third message (MSG3) in the random access procedure to the network device according to the uplink grant carried in the RAR. Because the content of these messages is not fixed during the random access procedure, different messages are carried under different scenarios. For example, sometimes a radio resource control (RRC) connection request may be carried, and sometimes some control messages or even service data packets may be carried.

In the future wireless communication systems such as 5G, the third message in the random access procedure may include the following:

1. In an initial RRC connection establishment procedure, when a terminal device transitions from the idle state to the connected state, the terminal device initiates the random access.

2. In RRC connection reestablishment procedure, when the radio link fails, the terminal device needs to re-establish the RRC connection, and the terminal device initiates the random access.

3. When the terminal device performs the handover, the terminal device initiates the random access in the target cell, and at this time the terminal device needs to establish the uplink synchronization with the new cell.

4. In the RRC connected state, when the downlink data arrives, but the terminal device is in a state of out of the uplink synchronization (the network device maintains an uplink timer, and if the uplink timer expires and the network device does not receive the sounding signal from the terminal device, the network device considers that the terminal device is out of the uplink synchronization), the network device will control the terminal device to initiate the random access.

5. In the RRC connected state, when the uplink data arrives, but the terminal device finds that the terminal device is in the uplink out-of-synchronization state (the network device maintains an uplink timer, and if the uplink timer expires and the terminal device does not receive the command that the network device adjusts the timing advance (TA), the terminal device considers that the terminal device is in the uplink out-of-synchronization state), or there is no physical uplink control channel (PUCCH) resource available for the scheduling request (SR) transmission, the terminal device initiates the random access.

6. When the terminal device transitions from the inactive state to the connected state, the random access is initiated.

7. The terminal obtains the system information.

According to an exemplary embodiment of the present disclosure, the RAR to the first preamble is a RAR that the terminal device first monitors in the at least one RAR window.

That is, the terminal device can transmit a third message to the network device according to the uplink grant carried by the first monitored RAR. Alternatively, the terminal device may also select one RAR in the case that multiple RARs are monitored in the at least one RAR window described above, and transmit the third message to the network device according to the uplink grant carried by the selected RAR. For example, if the terminal device monitors the multiple RARs, the terminal device may transmit the third message to the network device according to the uplink grant carried in the first monitored RAR. Also, the terminal device may transmit the third message to the network device according to the uplink grant carried in the RAR with the strongest signal in the received plurality of RARs. The terminal device may also select one RAR from the plurality of RARs according to other strategies, and then transmit the third message to the network device according to the uplink grant carried in the selected RAR, and the embodiments of the present disclosure are not limited to this.

According to an exemplary embodiment of the present disclosure, the random access procedure is a contention based random access procedure, or a non-contention based random access procedure, or a random access procedure for obtaining system information.

That is to say, the embodiments of the present disclosure do not specify the specific scenario of the random access procedure.

FIG. 9 shows a schematic block diagram of a random access method 200 according to an embodiment of the present disclosure. As shown in FIG. 9, the method 200 can include some or all of the following:

In S210, a network device receives a plurality of preambles transmitted by a terminal device in one random access procedure In S220, the network device feeds back at least one Random Access Response RAR corresponding to at least one preamble in the plurality of preambles to the terminal.

Specifically, the terminal device may transmit a plurality of preambles to the network device in one random process. Similarly, the network device may receive the plurality of preambles, and the network device may feed the RAR to at least one of the plurality of preambles back to the terminal device.

Therefore, in the random access method in the embodiment of the present disclosure, the network device may receive the plurality of preambles transmitted by the terminal device in one random access procedure, which is beneficial to improving the reliability of preamble transmission and probability of a network device responding to a preamble.

According to an exemplary embodiment of the present disclosure, feeding back, by the network device, at least one random access response RAR corresponding to at least one preamble in the plurality of preambles to the terminal device, includes: after receiving a first preamble in the plurality of preambles, feeding back by the network device the RAR corresponding to the first preamble to the terminal device; and after receiving the preamble(s) other than the first preamble in the plurality of preambles, not feeding back by the network device the RAR to the terminal device.

That is to say, after receiving the first preamble, the network device can feed back the RAR to the first preamble to the terminal device, and after receiving the other preamble(s), the network device does not feed back the RAR to the terminal device. In other words, the network device only feeds back one RAR to the terminal device, and the RAR is a RAR to the first preamble.

According to an exemplary embodiment of the present disclosure, the at least one RAR includes a plurality of RARs corresponding to the plurality of preambles one to one. Feeding back, by the network device, at least one random access response RAR corresponding to at least one preamble in the plurality of preambles to the terminal device, includes: feeding back, by the network device, a corresponding RAR to the terminal device, after receiving one of the plurality of preambles each time.

Specifically, every time a preamble is received, the network device can feed back the corresponding RAR to the terminal device, that is, the RAR that the network device feeds back to the terminal device has a one-to-one correspondence with the preamble received by the network device.

According to an exemplary embodiment of the present disclosure, feeding back, by the network device, at least one random access response RAR corresponding to at least one preamble in the plurality of preambles to the terminal device, includes: feeding back, by the network device, the at least one RAR to the terminal device after receiving of the plurality of preambles is completed.

The network device may also select at least one preamble for feedback after receiving all the preambles. For example, the network device configures the transmission resources for five preambles for the terminal device, and the network device can consider by default that the terminal device transmits the five preambles to the network device during one random access procedure. After the network device receives the five preambles, the network device can select one preamble from the five preambles to send feedback. If the network device receives three preambles and does not receive a fourth preamble within a predetermined time, the network device may consider by default that the other two preambles are lost, and may directly select one preamble from the received preambles to send feedback.

The manners in which the network device feeds back the RAR to the terminal device for the plurality of preambles described above is for illustrative purposes only, and the embodiments of the present disclosure are not limited thereto.

According to an exemplary embodiment of the present disclosure, feeding back, by the network device, at least one RAR corresponding to at least one preamble to the terminal device after receiving of the plurality of preambles is completed, includes: after receiving of the plurality of preambles is completed, feeding back, by the network device, the at least one RAR to the terminal device according to strength of a signal for receiving the plurality of preambles or a sequence for receiving the plurality of preambles.

The network device may feed back the RAR to the terminal device according to the sequence of the received preambles. For example, the network device can send feedback in response to one or more preambles that were received first. The network device can also feed back the RAR to the terminal device according to the signal strength(s) of the received preamble(s). For example, the network device may send feedback in response to one or more preambles having the strongest signal among the received plurality of preambles. It should be understood that the two ways of feeding back the RAR to the preambles to the terminal device are for illustrative purposes only and are not intended to limit the scope of the embodiments of the present disclosure.

According to an exemplary embodiment of the present disclosure, the at least one RAR includes a plurality of RARs, and the plurality of RARs are carried in one Medium Access Control (MAC) Data Protocol Unit (PDU).

Figure 10:
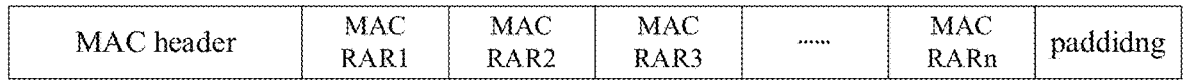
FIG. 10 shows a structural diagram of a MAC PDU carrying an RAR.

A person skilled in the art understands that the RAR is usually carried in a Media Access Control (MAC) Protocol Data Unit (PDU). The structure of the MAC PDU is as shown in FIG. 10. As can be seen from FIG. 10, the MAC PDU consists of a MAC header+zero or more MAC RAR (MAC Random Access Response)+possible padding. One of the MAC RARs corresponds to one preamble. Specifically, when the network device feeds back the RARs corresponding to the plurality of preambles to the terminal device, each RAR may be carried in a different MAC PDU, or multiple RARs may be carried in the same MAC PDU.

It should be understood that the terms "system" and "network" are used interchangeably herein. The term "and/or" herein is merely a term describing the association relationship of associated objects, and indicates that there may be three relationships. For example, A and/or B may indicate that: A exists only, both A and B exist, and B exists only. In addition, the character "/" herein generally indicates that the contextual objects are in an "or" relationship.

It should be understood that the interaction between the network device and the terminal device, and related characteristics and functions described from the perspective of the network device correspond to the related characteristics and functions that are described from the perspective of the terminal device. And, the relevant contents have already been described in detail in the method 100, and for brevity, repeated descriptions are omitted.

It should also be understood that, in various embodiments of the present disclosure, the sequence numbers of the above-mentioned processes do not mean the order of execution, and the execution order of the processes should be determined by their functions and internal logics, and should not constitute any limitation on the implementation processes of the embodiments of the present disclosure.

The random access methods according to the embodiments of the present disclosure are described in detail above, and the random access devices according to the embodiments of the present disclosure will be described below with reference to FIGS. 11 to 14. The technical features described in the method embodiments are applicable to the following device embodiments.

Figure 11:
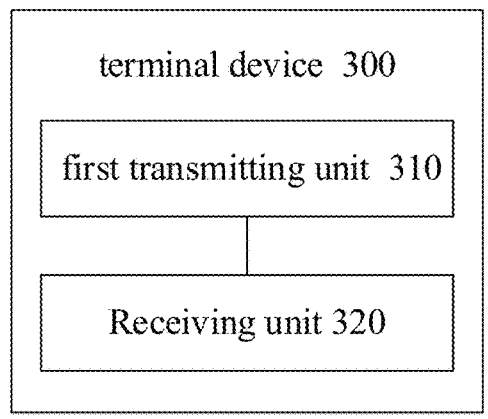
FIG. 11 shows a schematic block diagram of a terminal device according to an embodiment of the present disclosure.

FIG. 11 shows a schematic block diagram of a terminal device 300 according to an embodiment of the present disclosure. As shown in FIG. 11, the terminal device 300 includes a first transmitting unit 310 and a unit 320.

The first transmitting unit 310 is configured to transmit a plurality of preambles to a network device in one random access procedure.

The unit 320 is configured to monitor a random access response RAR to at least one preamble in the plurality of preambles in at least one random access response RAR window.

Therefore, the terminal device in the embodiment of the present disclosure transmits the plurality of preambles to the network device in one random access procedure, which is beneficial to improving the reliability of the preamble transmission and the probability of the network device responding to the preamble.

According to an exemplary embodiment of the present disclosure, the at least one RAR window includes one RAR window, and a starting position of the one RAR window in a time domain is located after transmission of the plurality of preambles. The monitoring unit is specifically configured to: monitor the RAR to the at least two preambles of the plurality of preambles in the one RAR window.

According to an exemplary embodiment of the present disclosure, the at least one RAR window includes one RAR window, and the starting position of the one RAR window in the time domain is located after transmission of a first preamble in the plurality of preambles and before a second preamble transmission in the plurality of preambles. The monitoring unit is specifically configured to: monitor the RAR to the at least two preambles of the plurality of preambles in the one RAR window.

According to an exemplary embodiment of the present disclosure, the at least one RAR window includes a plurality of RAR windows corresponding to the plurality of preambles in one-to-one correspondence, and a starting position of each of the plurality of RAR windows in the time domain is located after transmission of a corresponding preamble. The monitoring unit is specifically configured to: monitor the RAR to the corresponding preamble in each RAR window.

According to an exemplary embodiment of the present disclosure, a starting position of a first RAR window in the at least one RAR window in the time domain is located in a Kth sub-frame after a preamble transmission corresponding to the first RAR window, where K is an integer smaller than 3.

According to an exemplary embodiment of the present disclosure, the first transmitting unit is specifically configured to transmit the plurality of preambles to the network device through at least one physical random access channel PRACH resource in one random access procedure.

According to an exemplary embodiment of the present disclosure, the first transmitting unit is specifically configured to transmit the plurality of preambles to the network device through a plurality of PRACH resources corresponding to the plurality of preambles one to one in one random access procedure.

According to an exemplary embodiment of the present disclosure, the terminal device further includes: a second transmitting unit configured to transmit a message corresponding to the random access event to the network device according to an uplink grant carried in the RAR to the first preamble after the monitoring unit monitors the RAR to the first preamble in the plurality of preambles in the at least one RAR window.

According to an exemplary embodiment of the present disclosure, the RAR to the first preamble is a RAR that the terminal device first monitors in the at least one RAR window.

According to an exemplary embodiment of the present disclosure, the random access procedure is a contention based random access procedure, or a non-contention based random access procedure, or a random access procedure for obtaining system information.

It should be understood that the terminal device 300 according to the embodiments of the present disclosure may correspond to the terminal device in the method embodiments of the present disclosure, and the above-mentioned and other operations and/or functions of each unit in the terminal device 300 are respectively for implementing the corresponding processes of the terminal device in the methods described with reference to FIGS. 3 to 9, and for brevity, repeated descriptions are omitted here.

Figure 12:
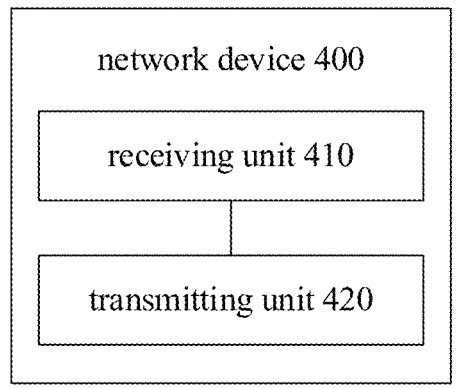
FIG. 12 shows a schematic block diagram of a network device according to an embodiment of the present disclosure.

FIG. 12 shows a schematic block diagram of a network device of an embodiment of the present disclosure. As shown in FIG. 12, the network device 400 includes a receiving unit 410 and a transmitting unit 420.

The receiving unit 410 is configured to receive a plurality of preambles transmitted by a terminal device in one random access procedure.

The transmitting unit 420 is configured to feed back at least one random access response RAR corresponding to at least one preamble in the plurality of preambles to the terminal device.

Therefore, the network device in the embodiment of the present disclosure can receive the plurality of preambles transmitted by the terminal device in one random access procedure, which is beneficial to improving the reliability of preamble transmission and probability of a network device responding to a preamble.

According to an exemplary embodiment of the present disclosure, the transmitting unit is specifically configured to, after a first preamble in the plurality of preambles is received, feed back the RAR corresponding to the first preamble to the terminal device; and after other preamble(s) than the first preamble in the plurality of preambles is(are) received, not feed back the RAR to the terminal device.

According to an exemplary embodiment of the present disclosure, the at least one RAR includes a plurality of RARs corresponding to the plurality of preambles one to one. The transmitting unit is specifically configured to, every time after receiving one of the plurality of preambles, feed back a corresponding RAR to the terminal device.

According to an exemplary embodiment of the present disclosure, the transmitting unit is specifically configured to feed back the at least one RAR to the terminal device, after receiving of the plurality of preambles is completed.

According to an exemplary embodiment of the present disclosure, the receiving unit is specifically configured to feed back the at least one RAR to the terminal device according to strength of a signal for receiving the plurality of preambles or a sequence for receiving the plurality of preambles.

According to an exemplary embodiment of the present disclosure, the at least one RAR includes the multiple RARs, and the multiple RARs are carried in one medium access control MAC data protocol unit PDU.

According to an exemplary embodiment of the present disclosure, the receiving unit 410 is specifically configured to: receive the plurality of preambles transmitted by the terminal device through at least one physical random access channel PRACH resource in one random access procedure.

According to an exemplary embodiment of the present disclosure, the receiving unit 410 is specifically configured to receive the plurality of preambles transmitted by the terminal device through multiple PRACH resources corresponding to the plurality of preambles one to one in one random access procedure.

Optionally, in the embodiment of the present disclosure, the random access procedure is a contention based random access procedure, or a non-contention based random access procedure, or a random access procedure for obtaining system information.

It should be understood that the network device 400 according to the embodiment of the present disclosure may correspond to the network device in the method embodiments of the present disclosure, and the above-mentioned and other operations and/or functions of each unit in the network device 400 are respectively for implementing the corresponding processes of the network device in the methods described with reference to FIG. 10, and for brevity, repeated descriptions are omitted.

Figure 13:
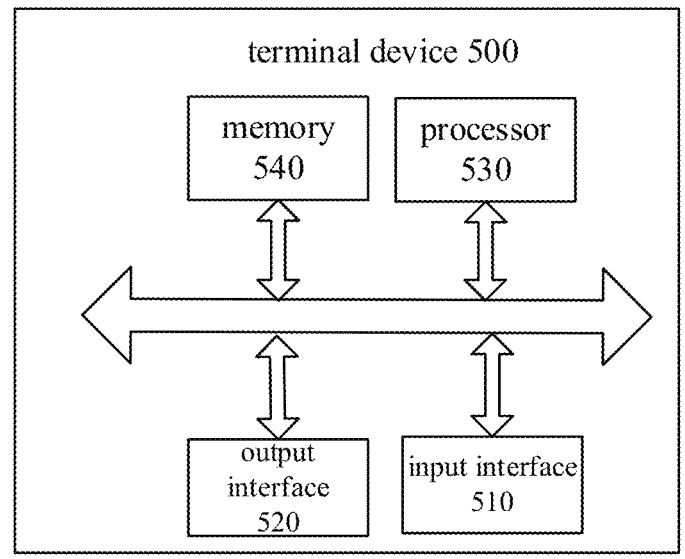
FIG. 13 shows another schematic block diagram of a terminal device according to an embodiment of the present disclosure.

As shown in FIG. 13, an embodiment of the present disclosure further provides a terminal device 500. The terminal device 500 may correspond to the terminal device 300 in FIG. 11, which can be used to execute the processes of the terminal device corresponding to the method 100 described with reference to FIGS. 3-9. The terminal device 500 includes an input interface 510, an output interface 520, a processor 530, and a memory 540. The input interface 510, the output interface 520, the processor 530, and the memory 540 can be connected by a bus system. The memory 540 is configured to store programs, instructions or codes. The processor 530 is configured to execute the programs, the instructions or the codes in the memory 540 to control the input interface 510 to receive a signal, and control the output interface 520 to transmit a signal to complete the operations in the foregoing method embodiments.

Therefore, the terminal device in the embodiment of the present disclosure transmits the plurality of preambles to the network device in one random access procedure, which is beneficial to improving the reliability of the preamble transmission and the probability of the network device responding to the preamble.

It should be understood that, in the embodiment of the present disclosure, the processor 530 may be a central processing unit (CPU), and the processor 530 may also be another general-purpose processor, a digital signal processor (DSP), Application Specific Integrated Circuit (ASIC), Field Programmable Gate Array (FPGA) or other programmable logic device, discrete gate or transistor logic device, discrete hardware component, etc. The general purpose processor may be a microprocessor or the processor or any conventional processor or the like.

The memory 540 can include read only memory and random access memory and provides instructions and data to the processor 530. A portion of the memory 540 may also include a non-volatile random access memory. For example, the memory 540 can also store information of the device type.

In the implementation process, the processes in the foregoing methods may be completed by an integrated logic circuit of hardware in the processor 530 or an instruction in a form of software. The contents of the methods disclosed in the embodiments of the present disclosure may be directly implemented by a hardware processor, or may be performed by a combination of hardware and software modules in the processor. The software modules can be located in a conventional storage medium such as random access memory, flash memory, read only memory, programmable read only memory or electrically erasable programmable memory, registers, or other well-known storage mediums in this art. The storage medium is located in the memory 540, and the processor 530 reads the information in the memory 540 and completes the contents of the above methods in corporation with the hardware. Repeated descriptions are not provided here for brevity.

In a specific implementation, the first transmitting unit and the second transmitting unit in the terminal device 300 may be implemented by the output interface 520 in FIG. 13, and the monitoring unit in the terminal device 300 may be implemented by the input interface 510 in FIG. 13.

Figure 14:
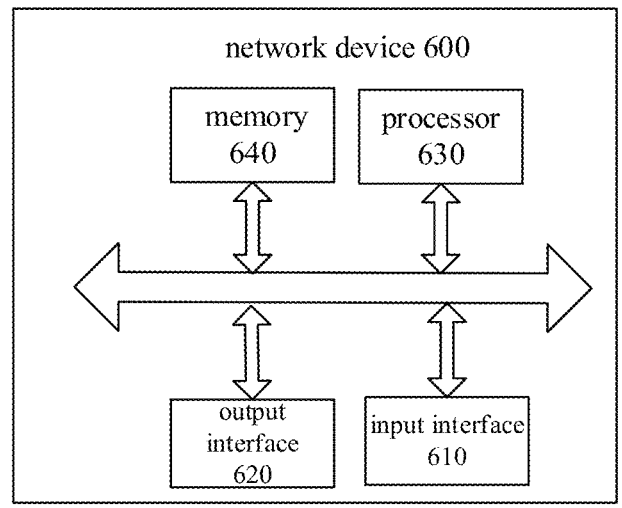
FIG. 14 shows another schematic block diagram of a network device according to an embodiment of the present disclosure.

As shown in FIG. 14, an embodiment of the present disclosure further provides a network device 600. The network device 600 may be the network device 400 in FIG.

5, and can be used to execute the contents of the network device corresponding to the method 200 in FIG. 10. The network device 600 includes an input interface 610, an output interface 620, a processor 630, and a memory 640. The input interface 610, the output interface 620, the processor 630, and the memory 640 can be connected by a bus system. The memory 640 is used to store programs, instructions or codes. The processor 630 is configured to execute the programs, the instructions or the codes in the memory 640 to control the input interface 610 to receive a signal, and control the output interface 620 to transmit a signal to complete the operations in the foregoing method embodiments.

Therefore, the network device in the embodiment of the present disclosure can receive multiple preambles transmitted by the terminal device in one random access procedure, which is beneficial to improving the reliability of the preamble transmission and the probability of the network device responding to the preamble.

It should be understood that in the embodiments of the present disclosure, the processor 630 may be a central processing unit (CPU), and the processor 630 can also be general purpose processors, digital signal processors (DSPs), application specific integrated circuits (ASICs), field programmable gate arrays (FPGAs) or other programmable logic devices, discrete gates or transistor logic devices, discrete hardware components, and so on. The general purpose processor may be a microprocessor can also be any conventional processor, and so on.

The memory 640 may include a read only memory and a random access memory and provides instructions and data to the processor 630. A portion of the memory 640 may also include a non-volatile random access memory. For example, the memory 640 can also store information of the device type.

In the implementation, the operations of the foregoing methods may be completed by an integrated logic circuit of hardware in the processor 630 or an instruction in a form of software. The steps of the methods disclosed in the embodiments of the present disclosure may be directly implemented by the hardware processor, or may be performed by a combination of hardware and software modules in the processor. The software modules can be located in a conventional storage medium such as a random access memory, a flash memory, a read only memory, a programmable read only memory or an electrically erasable programmable memory, a register, or other well-known storage mediums in this art. The storage medium is located in the memory 640, and the processor 630 reads the information in the memory 640 and completes the steps of the above methods in corporation with hardware. Repeated descriptions are omitted for brevity.

In a specific implementation, the transmitting unit in the network device 400 can be implemented by the output interface 620 in FIG. 14, and the first receiving unit and the second receiving unit in the network device 400 can be implemented by the input interface 610 in FIG. 14.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that for the convenience and brevity of the description, details of specific operation procedures of the systems, devices and units can be found in the previous descriptions regarding the method embodiments, and details are not described herein again.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the methods described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A random access method, comprising:
   transmitting, by a terminal device, a plurality of preambles to a network device in one random access procedure; and
   monitoring, by the terminal device, a Random Access Response (RAR) to at least one preamble in the plurality of preambles in at least one RAR window;

wherein the plurality of preambles are preambles with completely different sequences, the at least one RAR window comprises a plurality of RAR windows corresponding to the plurality of preambles one to one, and a starting position of each of the plurality of RAR windows in a time domain is located after transmission of a corresponding preamble;

wherein the monitoring, by the terminal device, the RAR to at least one preamble in the plurality of preambles in at least one RAR window, comprises:

monitoring, by the terminal device, the RAR to the corresponding preamble in each RAR window;

wherein a starting position of a first RAR window in the plurality of RAR windows in a time domain is located immediately after transmission of a preamble corresponding to the first RAR window.

2. The method according to claim 1, wherein the transmitting, by the terminal device, a plurality of preambles to the network device in one random access procedure, comprises:

transmitting, by the terminal device, the plurality of preambles to the network device through at least one Physical Random Access Channel (PRACH) resource in the one random access procedure.

3. The method according to claim 2, wherein the transmitting, by the terminal device, the plurality of preambles to the network device through at least one PRACH resource in the one random access procedure, comprises:

transmitting, by the terminal device, the plurality of preambles to the network device through a plurality of PRACH resources corresponding to the plurality of preambles one to one in the one random access procedure.

4. The method according to claim 1, wherein after the terminal device monitors the RAR to a first preamble in the plurality of preambles in the at least one RAR window, the method further comprises:

transmitting, by the terminal device, a third message in the random access procedure to the network device according to an uplink grant carried in the RAR to the first preamble.

5. The method according to claim 4, wherein the RAR to the first preamble is a RAR that the terminal device first monitors in the at least one RAR window.

6. The method according to claim 1, wherein the random access procedure is a contention based random access procedure, or a non-contention based random access procedure, or a random access procedure for obtaining system information.

7. A terminal device, comprising:
a processor; and
a memory storing instructions executable by the processor;
wherein the processor is configured to:
transmit a plurality of preambles to a network device in one random access procedure; and
monitor a Random Access Response (RAR) to at least one preamble in the plurality of preambles in at least one RAR window;
wherein the plurality of preambles are preambles with completely different sequences, the at least one RAR window comprises a plurality of RAR windows corresponding to the plurality of preambles one to one, and a starting position of each of the plurality of RAR windows in a time domain is located after transmission of a corresponding preamble;

wherein the processor is configured to:
monitor the RAR to the corresponding preamble in each RAR window;
wherein a starting position of a first RAR window in the plurality of RAR windows in a time domain is located immediately after transmission of a preamble corresponding to the first RAR window.

8. The terminal device according to claim 7, wherein the first processor is configured to:
transmit the plurality of preambles to the network device through at least one Physical Random Access Channel (PRACH) resource in the one random access procedure.

9. The terminal device according to claim 8, wherein the processor is configured to:
transmit the plurality of preambles to the network device through a plurality of PRACH resources corresponding to the plurality of preambles one to one in the one random access procedure.

10. The terminal device according to claim 7, wherein the processor is further configured to:
transmit a third message in the random access procedure to the network device according to an uplink grant carried in a RAR to a first preamble after the processor monitors the RAR to the first preamble in the plurality of preambles in the at least one RAR window; wherein the RAR to the first preamble is a RAR that the terminal device first monitors in the at least one RAR window.

11. The terminal device according to claim 7, wherein the random access procedure is a contention based random access procedure, or a non-contention based random access procedure, or a random access procedure for obtaining system information.

12. A non-transitory computer storage medium for storing computer software instructions configured to perform a random access method, wherein the method comprises:
transmitting a plurality of preambles to a network device in one random access procedure; and
monitoring a Random Access Response (RAR) to at least one preamble in the plurality of preambles in at least one RAR window;
wherein the plurality of preambles are preambles with completely different sequences, the at least one RAR window comprises a plurality of RAR windows corresponding to the plurality of preambles one to one, and a starting position of each of the plurality of RAR windows in a time domain is located after transmission of a corresponding preamble;
wherein the monitoring the RAR to at least one preamble in the plurality of preambles in at least one RAR window, comprises:
monitoring the RAR to the corresponding preamble in each RAR window;
wherein a starting position of a first RAR window in the plurality of RAR windows in a time domain is located immediately after transmission of a preamble corresponding to the first RAR window.

* * * * *